Patented July 15, 1941

2,249,460

UNITED STATES PATENT OFFICE 2,249,460

RESINOUS COMPOSITION

Gaetano F. D'Alelio, Pittsfield, Mass., assignor to General Electric Company, a corporation of New York No Drawing. Application November 23, 1938, Serial No. 242,021

4 Claims. (Cl. 260—19)

This invention relates to resinous compositions, and more particularly to resinous compositions obtained by condensing an active methylene-containing body such as formaldehyde with certain substituted phenols hereafter identified.

In my co-pending application Serial No. 242-022, filed concurrently herewith, and assigned to the same assignee as the present invention, I disclosed and claimed a novel method for the preparation of alpha phenyl alkyl phenols having the structural formula

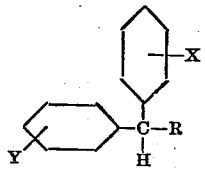

where R is an alkyl radical, X is either a monohydroxybenzene such as phenol, a dihydroxybenzene such as resorcinol, or a trihydroxybenzene such as pyrogallol, or alkyl, aryl or aralkyl substitution products of mono-, di-, or trihydroxybenzenes, which products have unoccupied reactive positions in the ring, and Y is either an unsubstituted benzene nucleus or a substituted benzene nucleus containing reactive positions in the ring.

I have discovered that certain of the above-described alpha phenyl alkyl phenols can be condensed with active methylene-containing bodies to produce new and useful resinous compositions. More particularly it may be stated that in practicing the present invention I use a substituted phenol having the structural formula

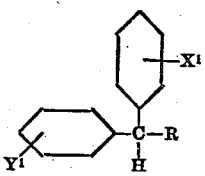

where R is an alkyl radical, X' is either an unsubstituted mono- or dihydroxybenzene or a substituted mono- or di-hydroxybenzene in which at least two methylene-reactive positions remain in the ring, and Y' is either an unsubstituted benzene nucleus or a non-methylene-reactive substituted benzene nucleus. In the formula given above it is to be understood that the substituent grouping in the aromatic ring X' is shown merely by way of illustration in the para position and that it includes within its meaning the introduction of said grouping in the ortho position of the aromatic ring X'. As pointed out more fully in my above-identified co-pending application, the positioning of the substituent grouping is determined by the general rules of aromatic substitution.

When those of the above-substituted phenols containing two and only two methylene-reactive positions in the ring are condensed with formaldehyde or a compound engendering formaldehyde, or with other active methylene-containing bodies, the resulting resins are characterized by solubility in fatty oils. Those substituted phenols of the above class which contain three methylene-reactive positions in the ring, when similarly condensed, yield resins of the type which will convert under heat to the infusible, insoluble state. These resins can be used in the manufacture of heat-hardenable molding compositions in accordance with conventional practice.

An example of a substituted phenol which, when condensed with formaldehyde or the like, will yield a curing resin is alpha phenyl alkyl resorcinol, which has the structural formula

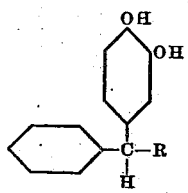

where R is an alkyl radical. A more specific example of such a phenolic body is alpha phenyl ethyl resorcinol.

Examples of substituted phenols of the above class which yield oil-soluble resins when condensed with formaldehyde or the like are ortho or para, alpha phenyl alkyl monohydric phenols. The structural formula of such a substituted phenol (and by way of illustration the para compound is given) is

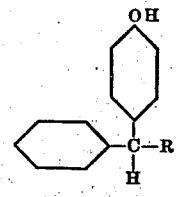

where R is an alkyl radical.

More specific examples of these substituted phenols are unsymmetrical para phenol-phenyl ethane, which has the structural formula

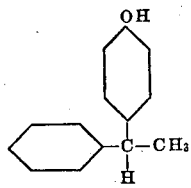

and unsymmetrical para (*m*-cresol)-phenyl ethane, the structural formula of which is

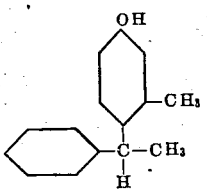

The oil-soluble resins prepared from these phenols are very light in color.

In forming the resinous compositions of this invention, either alkaline or acid catalysts can be used to expedite the condensation of the substituted phenol with the active methylene-containing body.

In order that those skilled in the art better may understand how the new resinous materials can be prepared, the following illustrative example thereof is given. All parts are by weight.

Twenty parts (0.1 mol) of redistilled unsymmetrical para phenol-phenyl ethane (unsymmetrical para-hydroxy phenyl, phenyl ethane), 8 to 12 parts (0.1 to 0.15 mol) of an aqueous solution of formaldehyde (approximately 37.5% HCHO) and 0.2 part oxalic acid dissolved in 1 part water are digested together under reflux for from 4 to 8 hours. From the foregoing it will be seen that unsymmetrical para phenol-phenyl ethane and formaldehyde are caused to react in the ratio of 1 mol of the former to from 1 to 1.5 mols of the latter. At the end of the reaction period the water formed during the reaction and introduced with the reactants is removed by distillation at reduced or atmospheric pressure. During distillation the temperature of the mass may reach 100° to 150° C. Heating is continued until a resin of the desired hardness is obtained. The product is a pale yellow, hard resin which is soluble in drying and other fatty oils, for example China-wood oil (tung oil), linseed oil, corn oil, soya bean oil, mixtures of such oils, fatty oil acids, etc.

The mixture of resin and oil may be heated to temperatures up to about 250° C. in effecting solution of the resin in the oil. The resulting solution may be bodied, if desired, according to methods well known in the art. To the solution of the resin in the oil there may be added 1% or more of suitable driers, such as metallic naphthenates or linoleates, for instance cobalt or manganese naphthenates or linoleates, to accelerate the drying of the films when used as protective coatings. Spirit thinners or other suitable thinning materials may be added to provide coating compositions of the desired viscosity. Pigments, dyes and other conventional ingredients of varnishes can be added.

What I claim as new and desire to secure by Letters Patent of the United States is:

1. The method of preparing a light-colored, oil-soluble resinous composition which comprises causing to react to resin formation unsymmetrical para phenol-phenyl ethane and formaldehyde in the ratio of 1 mol of the former to from 1 to 1.5 mols of the latter and in the presence of oxalic acid as a catalyst for the reaction.

2. A liquid coating composition comprising a drying oil having dissolved therein a light-colored, oil-soluble resinous composition which is the product of the method of claim 1.

3. A light-colored, oil-soluble resinous composition resulting from the method of claim 1.

4. A liquid coating composition comprising a volatile solvent, a drier and China-wood oil having dissolved therein a light-colored, oil-soluble resinous composition produced in accordance with the method of claim 1.

GAETANO F. D'ALELIO.